March 8, 1932.  E. B. WILFORD  1,848,555

AIRCRAFT

Filed Aug. 21, 1928   2 Sheets-Sheet 1

INVENTOR.
EDWARD BURKE WILFORD
BY Frank H. Borden
ATTORNEY.

March 8, 1932.    E. B. WILFORD    1,848,555
AIRCRAFT
Filed Aug. 21, 1928    2 Sheets-Sheet 2
FIG. 8.
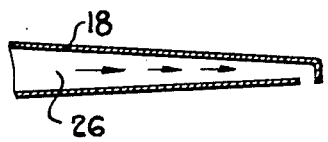
FIG. 9.
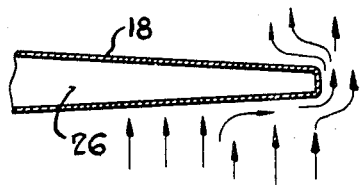
FIG. 10.
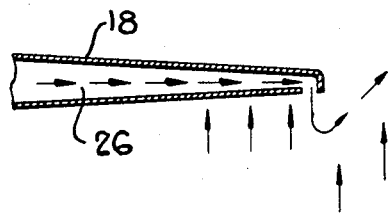
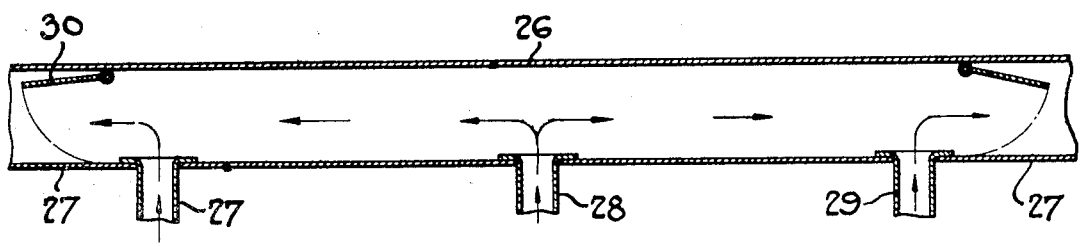
FIG. 11.
*INVENTOR.*
EDWARD BURKE WILFORD.
BY Frank H. Borden
*ATTORNEY.*

Patented Mar. 8, 1932

1,848,555

UNITED STATES PATENT OFFICE

EDWARD BURKE WILFORD, OF MERION, PENNSYLVANIA

AIRCRAFT

Application filed August 21, 1928. Serial No. 301,022.

This invention relates to aircraft.

Modern aircraft are possessed of certain disadvantages militating against universal use. One such is the lack of protection against the formation of ice on the wings. The formation of enough ice on the wings as to be hazardous, is a matter of moments only, when the climatic conditions are favorable to such formation, although the principal danger, aside from the added weight, lies in the deformation of the normal contour of the entering edge of the airfoil. Further, owing to the previous inability to efficiently muffle the internal combustion engines the noise of the exhaust has been a disagreeable and deterrent factor in the use of airplanes. The exhaust gases themselves are dangerous and have in the past been discharged in unsafe proximity to the passengers and pilot. From the point of view of efficiency of the airfoils used, the air leakage over the wing tips has appreciably affected the lift theoretically available from the airfoils.

Among the objects of the invention are; to obviate the disadvantageous factors of previous constructions as above noted; to provide an airplane with means preventing the formation of ice on the wings or airfoils thereof; to improve the construction of airfoils for aircraft; to provide an improved muffler for aircraft engines; to minimize the leakage of air over the wing tips of airfoils; to provide a combined exhaust manifold and muffler and a wing for airplanes; to provide a stabilizing means utilizing the exhaust gases of an airplane motor; to eliminate the dangers of carbon monoxide poisoning to operators of aircraft; to provide means for directing the exhaust gases from an internal combustion motor to a desired wing to increase the efficiency of that wing; and many other objects and advantages as will become more apparent as the description proceeds.

Figure 1:
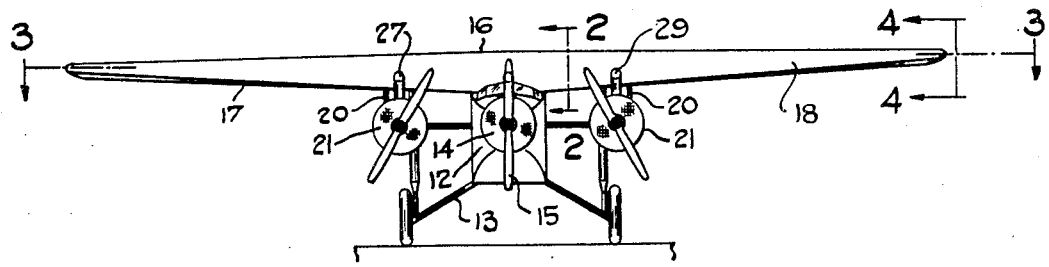
Figure 3:
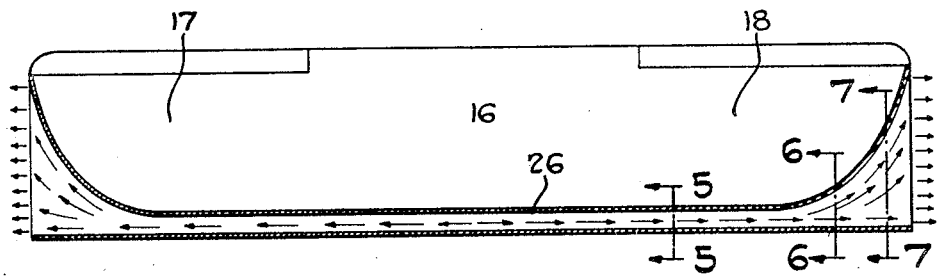
Figure 2:
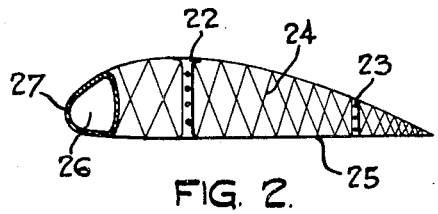
Figure 4:
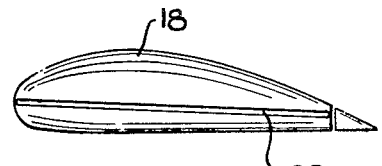
Figure 5:
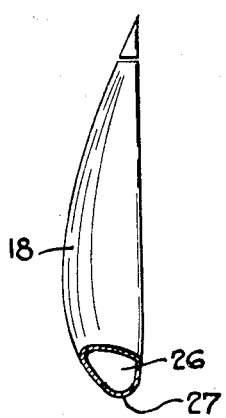
Figure 6:
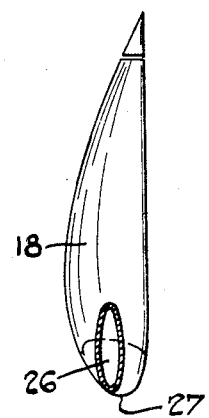
Figure 7:
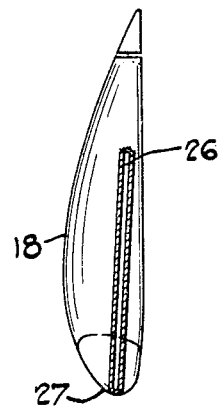

In the accompanying drawings forming part of this specification:

Fig. 1 represents a front elevation of an airplane embodying the preferred form of the invention, Fig. 2 represents a section through an airfoil according to the invention, Fig. 3 represents a plan view of an airfoil with the muffler of this invention shown in section as on line 3—3 of Fig. 1, by breaking away the surface of the airfoil, Fig. 4 represents an end elevation of the wing tip of the invention according to one form thereof, taken in the direction of the arrows 4—4 of Fig. 1, Figs. 5, 6, and 7 represent sections vertically of the entering edge of the airfoil, Fig. 8 represents a fragmentary vertical section through a modified form of wing tip, Fig. 9 represents a diagrammatic elevation indicating the normal leakage over the wing tip reducing the efficiency of the wing or airfoil, Fig. 10 represents a similar diagrammatic elevation indicating the diverted exhaust stream from the motor of the aircraft effecting a barrier to the normal leakage over the wing tip, Fig. 11 represents a diagrammatic horizontal section through the improved muffler, disclosing the dampers or valves controlling the direction of the flow of the exhaust.

It will be understood that the invention is equally applicable to single or multiple engined aircraft, as well as to monoplanes or biplanes, although for purely illustrative purposes the invention is shown embodied in a multiple motored monoplane.

The fuselage 12, having landing gear 13, houses or supports an engine 14, driving a propellor 15, and also has attached the airfoil 16 extending laterally in both directions from the fuselage. The airfoil forms wings 17 and 18, from which nacelles 20 supporting motors 21 are suspended to effect a multiple engined airplane as will be clear.

Each wing 17, or 18, and as they are identical but one will be described in detail, is preferably of all metal construction although this is not essential, including a front spar 22, rear spar 23, ribs 24, and a skin covering 25. This latter may well be of an alloy of metal, such as duralumin. The entering edge of the wing comprises a pipe 26 extending parallel with the spars, and which is suitably rigidly connected to the metal ribs, and to the skin covering as to provide an entering edge 27 properly contoured for the airfoil of which it forms a part.

The pipe or conduit 26 may be formed in any desired manner, as by welding strips of metal into the nose or entering edge, or in any other desired manner, and preferably extends from the tip of one wing across the fuselage to the tip of the other wing. Clearly, however, each wing might have a separate pipe for the general effect of the invention.

It is preferred that the pipe 26 be gradually tapered toward the ends of the wings so that the top and bottom surfaces are but slightly spaced apart, while the front and rear surfaces are widely divergent until they are as wide as the wing at the tip.

As shown in Fig. 4, this presents a narrow slot the passage through which is parallel with the lateral extent of the wing, which when properly coupled with the exhaust from the engine or engines provides a thin stratum of gases projecting laterally from the wing tip and minimizing the leakage over the wing tip. This leakage is substantially as shown in Fig. 9, and interferes with the lift that should theoretically be obtained from the extreme edge of the wing. As shown in Figs. 8, and 10, however, the slot in the edge of the wing tip through which the exhaust gases are expelled, may be directed at an angle with the horizontal, to impose a barrier of gas past which the airstream on the wing finds difficulty in passing, thus increasing the pressure on the wing tip and increasing its effective lift.

It is to be noted that the passage of the exhaust gases downwardly at the wing tip has an upward reaction on the wing tip such as to present means for controlling the lateral stability of the aircraft. Although the pressure is possibly relatively small, when applied at the end of the lever represented by the wing has appreciably turning force, and this utilization of the exhaust pressure is an important feature of the invention.

As shown in the diagrammatic section of Fig. 11, the pipe 26, has intake ports 27, 28 and 29, coupled to the exhaust manifolds of the respective engines or motors, and is provided moreover with dampers 30, arranged for control by the pilot in any desired manner, whereby the exhaust may flow evenly out through both wings, or be diverted to vent through either wing, as desired.

In operation the motors are quite silent owing to the exhaust passing into the mufflers, and the exhaust gases are voided or vented at the wing tips, thus keeping the dangerous exhaust gases out of proximity to the passengers or pilot, an important feature of invention. The exhaust gases maintain the entering edges of the wings at such a high temperature that the formation of ice thereon is practically impossible, and by proper manipulation of the valves or dampers the gases are caused to pass into either wing so as to correct an improper condition thereof, whether of ice formation, or wing tip leakage, and if desired by the utilization of the force of reaction the manipulation of the dampers may be utilized for the lateral stability of the aircraft, either as supplemental to the ailerons, or in place of them.

I claim as my invention:

1. In an airfoil, an exhaust manifold comprising a continuous pipe forming the entering edge of the airfoil, the pipe being tapered toward the end to provide a fan shaped discharge slot, and the wing being correspondingly tapered from the center to the outside edge.

2. In aircraft a wing tapering in thickness from the center to the outside edge, and a continuous exhaust pipe disposed in the wing and similarly tapered from the center to the outside edge, said pipe also tapered in the line of the chord of the wing from the outside edge toward the center to form a fan shaped discharge slot.

In testimony whereof I affix my signature.

EDWARD BURKE WILFORD.